3,476,762
4'-DIMETHYLAMINO-4-[4-HYDROXY-4-PHENYL PIPERIDINO]BUTYROPHENONES AND 4-[4-PHENYL-4-HYDROXY-PIPERIDINO]-1,1-ETHYLENEDIOXY-1-(4-DIMETHYLAMINOPHENYL) BUTANES
John H. Biel, Milwaukee, Wis., assignor to Aldrich Chemical Company, Inc., Milwaukee, Wis., a corporation of Wisconsin
No Drawing. Filed Dec. 27, 1966, Ser. No. 604,580
Int. Cl. C07d 29/16; A61k 27/00
U.S. Cl. 260—294.7
14 Claims

ABSTRACT OF THE DISCLOSURE

Substituted piperidines of the formula

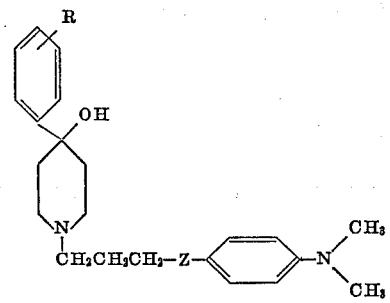

in which R is chloro, bromo, iodo, fluoro or trifluoromethyl, and

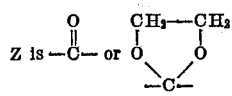

which possess tranquilizing activity and are useful as tranquilizing agents in mammals and processes for the preparation thereof.

---

It is is an object of the present invention to provide novel chemical compounds which have tranquilizing activity and are useful to induce tranquility in mammals and to provide processes for the preparation thereof.

In accordance with the present invention, there is provided a member selected from the group consisting of compounds of the formula (I)

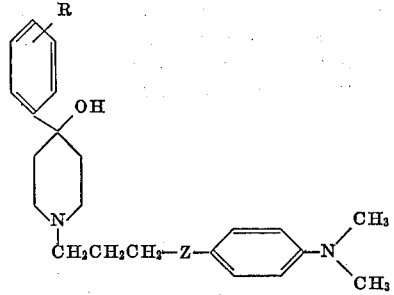

wherein R is chloro, bromo, iodo, fluoro or trifluoromethyl, and Z is

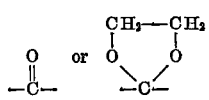

and the pharmaceutically acceptable nontoxic salts thereof.

The pharmaceutically acceptable non-toxic salts include the organic and inorganic acid addition salts, e.g., those prepared from acids such as hydrochloric, sulfuric, sulfanic, tartaric, fumaric, hydrobromic, glycolic, citric, maleic, phosphoric, succinic, acetic, nitric, and the like. Such salts are prepared by conventional methods.

Thus the compounds of the present invention have the following formulae (II)

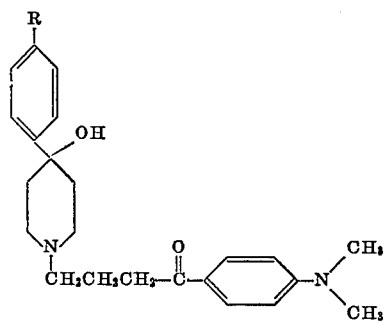

(III)

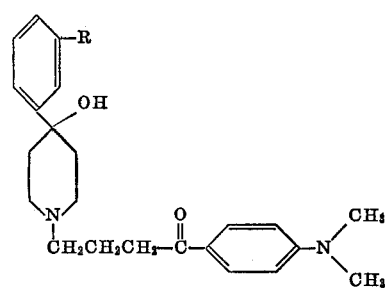

(IV)

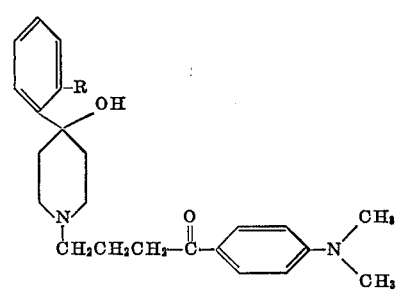

(V)

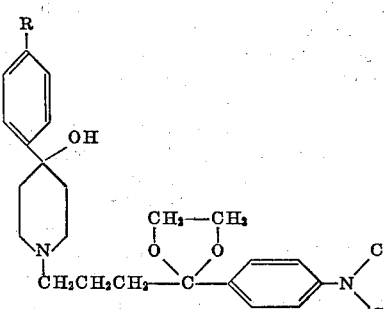

(VI)

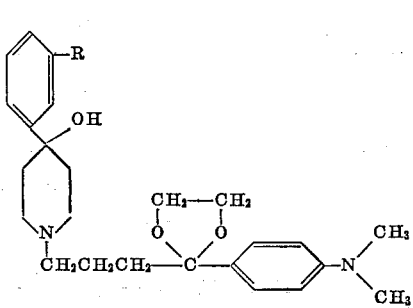

(VII)

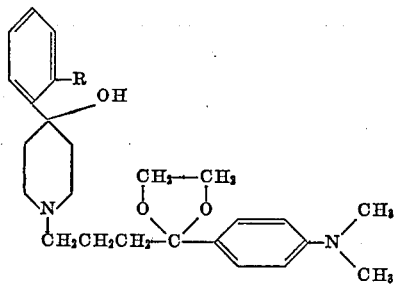

wherein R is as described above.

The compounds of this invention exhibit tranquilizing activity in mammals and are useful as tranquilizing agents.

The tranquilizing activity of the compounds of this invention is indicated by their ability when administered to rats to block a conditioned response in the usual test, in which the rats are trained to climb a pole when a buzzer is sounded in order to avoid a subsequent electric shock to their feet if they remain on the floor of the cage. For example, when 4′-dimethylamino-4-[4-hydroxy-4-(4-chlorophenyl)piperidino]butyrophenone was administered p.o. in rats, it exhibited an $ED_{50}$ of 8 mgm./kg. and when 4′ - dimethylamino - 4 - [4-hydroxy-4-(3-trifluoromethylphenyl)piperidino]butyrophenone was administered, it exhibited an $ED_{50}$ of 2 mgm./kg.

The compounds of the present invention are prepared by reacting a piperidine of the formula (VIII)

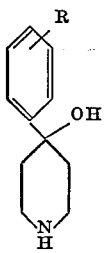

wherein R is as described above, with a halide of the formula (IX)

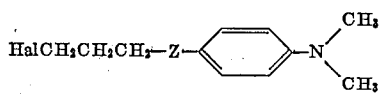

wherein Z is as described above and Hal is chloro, bromo or iodo, but preferably chloro. Preferably the reaction is carried out in the presence of a suitable solvent, e.g. benzene, toluene, dimethylformamide, dimethylsulfoxide and the like, and in the presence of an acid acceptor such as triethylamine. The reaction is preferably carried out at elevated temperature, e.g., reflux temperature.

The preparation of the compounds of Formula VIII is described in British Patents Nos. 881,893 and 895,309 and also by C. J. Schmidle and R. C. Mansfield, J. Am. Chem. Soc. 78, 1709 (1956). Compounds of Formula IX are prepared according to the general procedure described in the foregoing British patents, the preparation thereof follows the following reaction scheme:

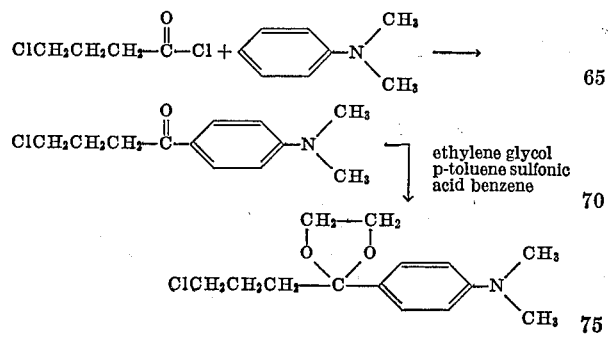

Dimethylaminobenzene and γ-chlorobutyryl chloride react to produce γ-chloro-p-dimethylaminobutyrophenone. The preparation of the cyclic ketal proceeds readily by interacting the γ-chloro-p-dimethylaminobutyrophenone with ethyleneglycol in benzene in the presence of p-toluenesulfonic acid. The water formed is removed by azeotropic distillation.

Compounds of Formula IX wherein Z is

can also be prapared as exemplified below by the following reaction scheme:

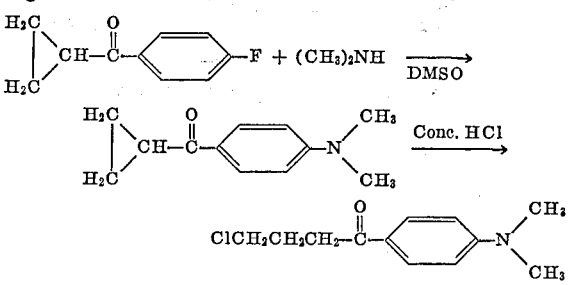

Alternatively, the compounds of this invention wherein Z is

may be prepared by the following methods:

(1) A p-fluorobutyrophenone of the formula (X)

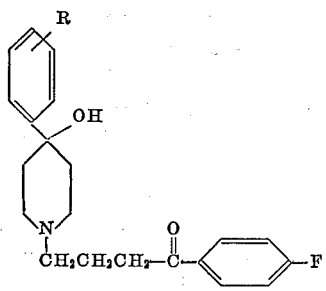

wherein R is as described above, is reacted with dimethylamine in the presence of an aprotic solvent, e.g. dimethylsulfoxide or dimethylformamide, preferably at elevated temperature, e.g., 80–110° C. The preparation of the p-fluorobutyrophenone of Formula X is also described in British Patents Nos. 881,893 and 895,309.

(2) A reaction scheme as follows:

(XI)  (XII)

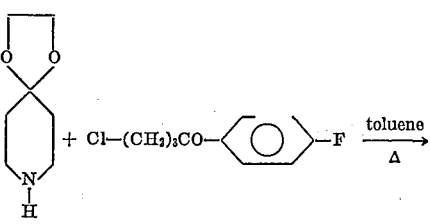

(XIII)

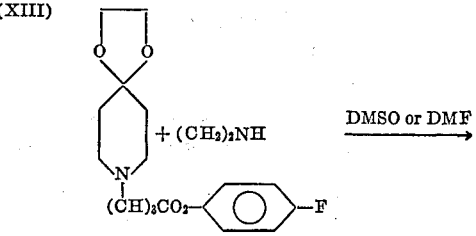

(XIV)
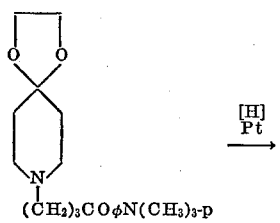

(XV)
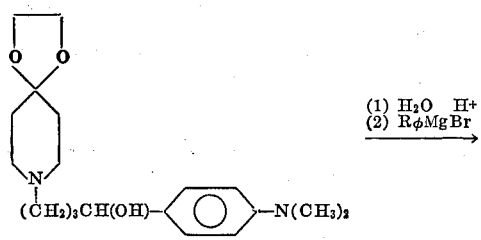

(XVI)
R—φ   OH (CH₂)₃CH(OH)—⟨O⟩—N(CH₃)₂

Oppenauer or MnO₂ oxidation
→

(XVII)
R—φ   OH (CH₂)₃CO—⟨O⟩—N(CH₃)₂

Cyclic ketal (XI) is reacted with the p-fluoro γ-chlorobutyrophenone (XII) in an inert solvent such as toluene to prevent displacement of the aromatic fluorine atom. Interaction of the p-fluoroketone (XIII) with dimethylamine in aprotic solvent, such as dimethylsulfoxide or dimethylformamide provides the dimethylamino ketone (XIV). Catalytic hydrogenation of the butyrophenone (XIV) to the alcohol (XV) followed by cleavage of the cyclic ketal and subsequent reaction with the appropriate phenyl Grignard reagent yields the diol (XVI) which upon oxidation affords the aminoketone (XVII).

The compounds of this invention may be administered as the free bases or in the form of their nontoxic addition salts. They may be compounded and formulated into pharmaceutical preparations for oral or parenteral administration with organic or inorganic solid materials or liquids which are pharmaceutically acceptable carriers. Some examples of the carriers which can be used are gelatin capsules, sugars, cellulose derivatives such as carboxymethylcellulose, gelatin, talc, magnesium stearate, vegetable oil such as peanut oil, etc., liquid petroleum, glycerin, sorbitol, ethanol, agar and water. The compositions may take the form of tablets, powders, granules, capsules, suspensions, solutions and the like.

The compositions comprise not more than about 200 mg./kg. per dosage unit and preferably from about 1 to about 200 mg./kg. of a compound of this invention together with a suitable carrier. Such compositions are considered within the scope of this invention.

The compounds of this invention when administered orally or parenterally in an effective amount are effective in inducing tranquility in mammals.

The following examples are intended to illustrate the invention described herein without unduly restricting it.

Example 1.—Preparation of 4'-fluoro-4-[4-hydroxy-4-(4-chlorophenyl)piperidino]butyrophenone

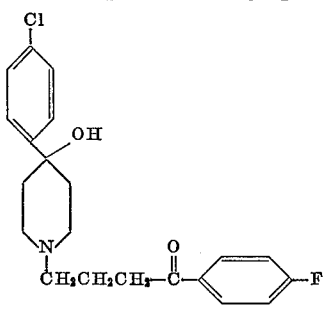

A mixture of 10.6 g. (0.05 mole) of 4-(4-chlorophenyl)-4-hydroxypiperidine, 12.0 g. (0.06 mole) of γ-chloro-p-fluoro-butyrophenone, 4.2 g. (0.05 mole) of sodium bicarbonate and 300 ml. of toluene was refluxed for 24 hours. The reaction mixture was cooled to 25° C. and filtered. The solid collected was washed with a 1:1 chloroform-toluene solution. The filtrate was concentrated in vacuo giving a semi-solid residue which was recrystallized from benzene-n-heptane, yielding 12 g. of the product, 4'-fluoro-4-[4-hydroxy - 4 - (4 - chlorophenyl)piperidino]butyrophenone, M.P. 149–150° C., lit. M.P. 148–149.4° C.

*Analysis.*—Calc'd for $C_{21}H_{23}NO_2ClF$: C, 67.10; H, 6.17; N, 3.73. Found: C, 67.02; H, 6.25; N, 3.67.

Example 2.—Preparation of 4'-dimethylamino-4-[4-hydroxy-4-(4-chlorophenyl)piperidino]butyrophenone

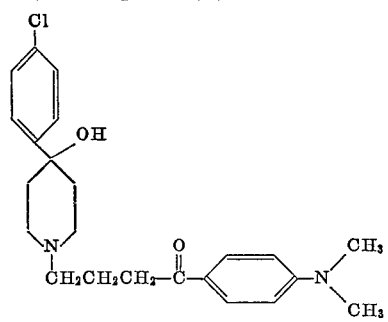

A solution of 3.75 g. (0.001 mole) of 4'-fluoro-4-[4-hydroxy - 4 - (4-chlorophenylpiperidino]butyrophenone in 50 ml. of dimethylsulfoxide was heated and stirred at 110° C. for 6 hours during which time dimethylamine gas was bubbled through the reaction mixture. The mixture was cooled to 25° C., and poured into 200 ml. of cold water; the precipitated solid was filtered, washed with water, dried and recrystallized from 2-propanol. Yield: 3.0 g. of 4'-dimethylamino-4-[4-hydroxy - 4 - (4-chlorophenyl)piperidino]butyrophenone, M.P. 164–165° C.

*Analysis.*—Calc'd for $C_{23}H_{29}N_2O_2Cl$: C, 68.90; H, 7.29; N, 6.99. Found: C, 68.95; H, 7.69; N, 6.92.

Example 3.—Preparation of 4'-dimethylamino-4-[4-hydroxy - 4 - (3-trifluoromethylphenyl)piperidino]butyrophenone

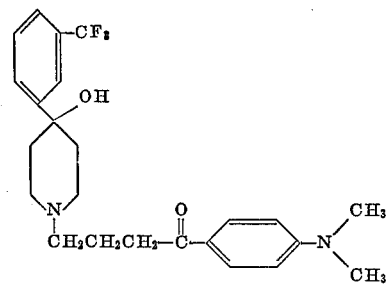

A mixture of 4' - fluoro - 4 - [4-hydroxy-4-(3-trifluoromethylphenyl)piperidino]butyrophenone (P. A. J. Janssen, British Patent No. 895,309, C. A. 57, 15081d), (4.1 g., 0.01 mole) and 50 ml. of dimethylsulfoxide was heated and stirred at 80° C. and bubbled with gaseous dimethylamine for 4 hours. The mixture was cooled to 25° C. and poured into 400 ml. of cold water. The resulting solid was collected by filtration at reduced pressure, dried, and recrystallized from 2-propanol. Yield: 3.5 g. of 4'-dimethylamino-4-[4-hydroxy - 4 - (3-trifluoromethylphenyl)piperidino]butyrophenone, M.P. 129–131° C.

Analysis.—Calc'd for $C_{24}H_{29}N_2O_2F_3$: C, 66.34; H, 6.73; N, 6.45. Found: C, 66.32; H, 6.76; N, 6.47.

Example 4

When, in the procedure of Example 1, 4-(4-chlorophenyl)-4-hydroxypiperidine is replaced by an equal molar amount of:
4-(4-bromophenyl)-4-hydroxypiperidine,
4-(4-trifluoromethylphenyl)-4-hydroxypiperidine,
4-(4-iodophenyl)-4-hydroxypiperidine,
4-(4-fluorophenyl)-4-hydroxypiperidine,
4-(3-chlorophenyl)-4-hydroxypiperidine,
4-(3-bromophenyl)-4-hydroxypiperidine,
4-(3-iodophenyl)-4-hydroxypiperidine,
4-(3-fluorophenyl)-4-hydroxypiperidine,
4-(2-chlorophenyl)-4-hydroxypiperidine,
4-(2-bromophenyl)-4-hydroxypiperidine,
4-(2-iodophenyl)-4-hydroxypiperidine,
4-(2-fluorophenyl)-4-hydroxypiperidine and
4-(2-trifluoromethylphenyl)-4-hydroxypiperidine,
there are obtained,
4'-fluoro-4-[4-hydroxy-4-(4-bromophenyl)piperidino]butyrophenone,
4'-fluoro-4-[4-hydroxy-4-(4-trifluoromethylphenyl)piperidino]-butyrophenone,
4'-fluoro-4-[4-hydroxy-4-(4-iodophenyl)piperidino]butyrophenone,
4'-fluoro-4-[4-hydroxy-4-(4-fluorophenyl)piperidino]butyrophenone,
4'-fluoro-4-[4-hydroxy-4-(3-chlorophenyl)piperidino]butyrophenone,
4'-fluoro-4-[4-hydroxy-4-(3-bromophenyl)piperidino]butyrophenone,
4'-fluoro-4-[4-hydroxy-4-(3-iodophenyl)piperidino]butyrophenone,
4'-fluoro-4-[4-hydroxy-4-(3-fluorophenyl)piperidino]butyrophenone,
4'-fluoro-4-[4-hydroxy-4-(2-chlorophenyl)piperidino]butyrophenone,
4'-fluoro-4-[4-hydroxy-4-(2-bromophenyl)piperidino]butyrophenone,
4'-fluoro-4-[4-hydroxy-4-(2-iodophenyl)piperidino]butyrophenone,
4'-fluoro-4-[4-hydroxy-4-(2-fluorophenyl)piperidino]butyrophenone and
4'-fluoro-4-[4-hydroxy-4-(2-trifluoromethylphenyl)piperidino]butyrophenone,
respectively.

Example 5

When, in the procedure of Example 2, 4'-fluoro-4-[-4-hydroxy-4 - (4 - chlorophenyl)piperilino]butyrophenone is replaced by an equal molar amount of each of the products of Example 4, there are obtained:

4'-dimethylamino-4-[4-hydroxy-4-(4-bromophenyl)piperidino]butyrophenone,
4'-dimethylamino-4-[4-hydroxy-4-(4-trifluoromethylphenyl)piperidino]butyrophenone,
4'-dimethylamino-4-[4-hydroxy-4-(4-iodophenyl)piperidino]butyrophenone,
4'-dimethylamino-4-[4-hydroxy-4-(4-fluorophenyl)piperidino]butyrophenone,
4'-dimethylamino-4-[4-hydroxy-4-(3-chlorophenyl)piperidino]butyrophenone,
4'-dimethylamino-4-[4-hydroxy-4-(3-bromophenyl)piperidino]butyrophenone,
4'-dimethylamino-4-[4-hydroxy-4-(3-iodophenyl)piperidino]butyrophenone,
4'-dimethylamino-4-[4-hydroxy-4-(3-fluorophenyl)piperidino]butyrophenone,
4'-dimethylamino-4-[4-hydroxy-4-(2-chlorophenyl)piperidino]butyrophenone,
4'-dimethylamino-4-[4-hydroxy-4-(2-bromophenyl)piperidino]butyrophenone,
4'-dimethylamino-4-[4-hydroxy-4-(2-iodophenyl)piperidino]butyrophenone,
4'-dimethylamino-4-[4-hydroxy-4-(2-fluorophenyl)piperidino]butyrophenone and
4'-dimethylamino-4-[4-hydroxy-4-(2-trifluoromethylphenyl)piperidino]butyrophenone,
respectively.

Example 6.—Preparation of cyclopropyl 4-dimethylaminophenyl ketone

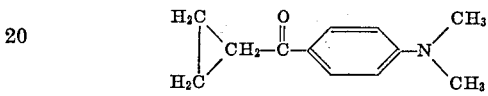

Into a mixture of 18,7 g. (0.114 mole) of p-fluorophenyl cyclopropyl ketone in dimethylsulfoxide kept at 85° C. was passed dimethylamine gas for a period of 5 hours. The reaction mixture was poured into water and the solid precipitate separated by filtration, M.P. 133–138° C., yield 19.5 g. Recrystallization from cyclohexane gave 14.5 g. of the pure solid, cyclopropyl 4-dimethylaminophenyl ketone, M.P. 137–140° C.

Example 7.—Preparation of γ-chloro-p-dimethylaminobutyrophenone

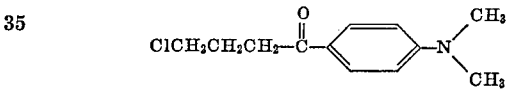

A mixture containing 5.7 g. (0.03 mole) of p-dimethylaminophenyl cyclopropyl ketone and 16 cc. of concentrated hydrochloric acid was heated at reflux for 5 minutes, and then poured into 250 cc. of water. The resulting product was separated by filtration, M.P. 93–94° C., yield 5.6 g. of γ-chloro-p-dimethylaminobutyrophenone.

Example 8.—Alternate preparation of 4'-dimethylamino-4 - [4 - hydroxy - 4 - (4 - chlorophenyl)piperidino]butyrophenone A mixture of 4-hydroxy-4-(4-chlorophenyl)piperidine (0.025 mole), triethylamine (0.025 mole), γ-chloro-p-dimethylaminobutyrophenone in dimethylsulfoxide is stirred and heated at reflux until the reaction is completed. The reaction mixture is cooled to 25° C. and poured into cold water containing 0.025 mole sodium bicarbonate; the precipitated solid is filtered, washed with water, dried and recrystallized from 2-propanol to yield the product, 4'-dimethylamino-4-[4-hydroxy-4-(4-chlorophenyl)piperidino]butyrophenone.

Example 9.—Preparation of 4-[4-chlorophenyl) - 4-hydroxy - piperidino] - 1,1 - ethylenedioxy - 1 - (4-dimethylaminophenyl)butane

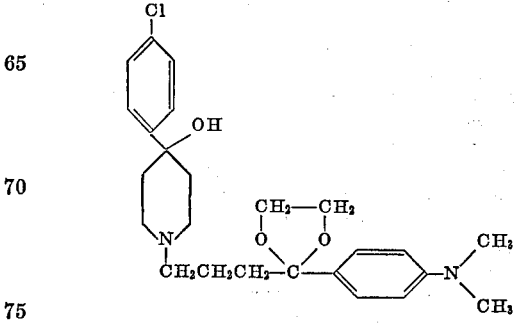

A mixture of 4-hydroxy-4-(4-chlorophenyl)piperidine (0.025 mole), triethylamine (0.025 mole), 4-chloro-1,1-ethylenedioxy-1-(4 - dimethylaminophenyl)butane in dimethylsulfoxide is stirred and heated at reflux until the reaction is completed. The reaction mixture is cooled to 25° C. and poured into cold water containing 0.025 mole sodium bicarbonate; and precipitated solid is filtered, washed with water, dried and recrystallized from 2-propanol to yield the product, 4-[4-(4-chlorophenyl) - 4-hydroxypiperidine]-1,1-ethylenedioxy - 1 - (4 - dimethylaminophenyl)butane.

Example 10

When, in the procedure of Example 9, 4-hydroxy-4-(4-chlorophenyl)piperidine is replaced by an equal molar amount of:

4-(4-bromophenyl)-4-hydroxypiperidine,
4-(4-trifluoromethylphenyl)-4-hydroxypiperidine,
4-(4-iodophenyl)-4-hydroxypiperidine,
4-(4-fluorophenyl)-4-hydroxypiperidine,
4-(3-chlorophenyl)-4-hydroxypiperidine,
4-(3-bromophenyl)-4-hydroxypiperidine,
4-(3-iodophenyl)-4-hydroxypiperidine,
4-(3-fluorophenyl)-4-hydroxypiperidine,
4-(3-trifluoromethylphenyl)-4-hydroxypiperidine,
4-(2-chlorophenyl)-4-hydroxypiperidine,
4-(2-bromophenyl)-4-hydroxypiperidine,
4-(2-iodophenyl)-4-hydroxypiperidine,
4-(2-fluorophenyl)-4-hydroxypiperidine and
4-(2-trifluoromethylphenyl)-4-hydroxypiperidine, there are obtained, 4-[4-(4 - bromophenyl) - 4 - hydroxypiperidino] - 1,1-ethylenedioxy-1-(4-dimethylaminophenyl)butane,
4-[4-(4-trifluoromethylphenyl) - 4 - hydroxypiperidino]-1,1-ethylenedioxy-1-(4-dimethylaminophenyl)butane,
4-[4-(4-iodophenyl)-4-hydroxypiperidino]-1,1 - ethylenedioxy-1-(4-dimethylaminophenyl)butane,
4-[4-(4 - fluorophenyl) - 4 - hydroxypiperidino] - 1,1-ethylenedioxy-1-(4-dimethylaminophenyl)butane,
4-[4-(3 - chlorophenyl) - 4 - hydroxypiperidino] - 1,1-ethylenedioxy-1-(4-dimethylaminophenyl)butane,
4-[4-(3 - bromophenyl) - 4 - hydroxypiperidino] - 1,1-ethylenedioxy-1-(4-dimethylaminophenyl)butane,
4-[4-(3 - iodophenyl) - 4 - hydroxypiperidino] - 1,1-ethylenedioxy-1-(4-dimethylaminophenyl)butane,
4-[4-(3 - fluorophenyl) - 4 - hydroxypiperidino] - 1,1-ethylenedioxy-1-(4-dimethylaminophenyl)butane,
4-[4-(3-trifluoromethylphenyl) - 4 - hydroxypiperidino]-1,1-ethylenedioxy-1-(4-dimethylaminophenyl)butane,
4-[4-(2 - chlorophenyl) - 4 - hydroxypiperidino] - 1,1-ethylenedioxy-1-(4-dimethylaminophenyl)butane,
4-[4-(2 - bromophenyl) - 4 - hydroxypiperidino] - 1,1-ethylenedioxy-1-(4-dimethylaminophenyl)butane,
4-[4-(2 - iodophenyl) - 4 - hydroxypiperidino] - 1,1-ethylenedioxy-1-(4-dimethylaminophenyl)butane,
4-[4-(2 - fluorophenyl) - 4 - hydroxypiperidino] - 1,1-ethylenedioxy-1-(4-dimethylaminophenyl)butane and
4-[4-(2-trifluoromethylphenyl) - 4 - hydroxypiperidino]-1,1-ethylenedioxy-1-(4-dimethylaminophenyl)butane, respectively.

While this invention has been described in terms of its preferred embodiment, those skilled in the art will appreciate that modifications can be made without departing from the spirit and scope of the invention.

What is claimed is:

1. A compound selected from the group consisting of compounds of the formula

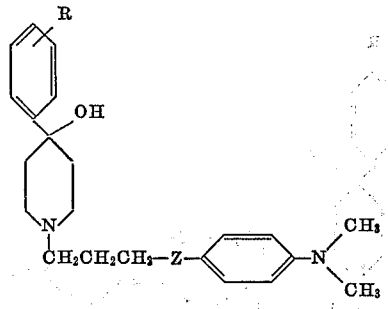

wherein R is a member selected from the group consisting of chloro, bromo, iodo, fluoro and trifluoromethyl, and Z is a member selected from the group consisting of

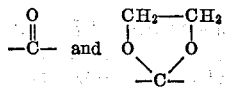

and the pharmaceutically acceptable nontoxic salts thereof.

2. A compound of claim 1 having the formula

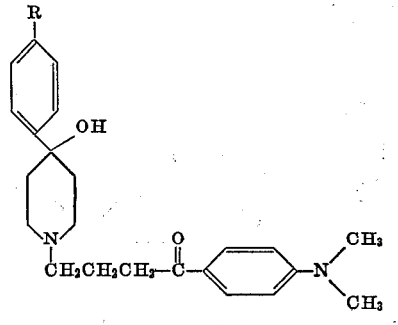

wherein R is a member selected from the group consisting of chloro, bromo, iodo, fluoro and trifluoromethyl, and the pharmaceutically acceptable nontoxic salts thereof.

3. A compound of claim 1 having the formula

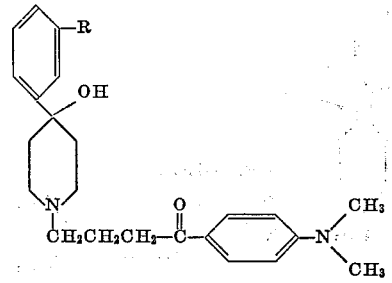

wherein R is a member selected from the group consisting of chloro, bromo, iodo, fluoro and trifluoromethyl, and the pharmaceutically acceptable nontoxic salts thereof.

4. A compound of claim 1 having the formula

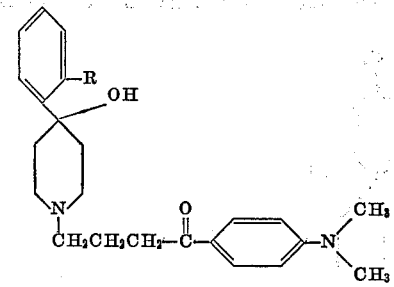

wherein R is a member selected from the group consisting of chloro, bromo, iodo, fluoro and trifluoromethyl, and the pharmaceutically acceptable nontoxic salts thereof.

5. A compound of claim 1 having the formula

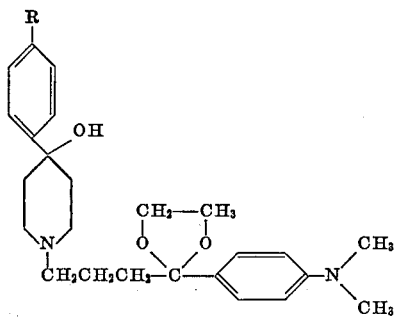

wherein R is a member selected from the group consisting of chloro, bromo, iodo, fluoro and trifluoromethyl, and the pharmaceutically acceptable nontoxic salts thereof.

6. A compound of claim 1 having the formula

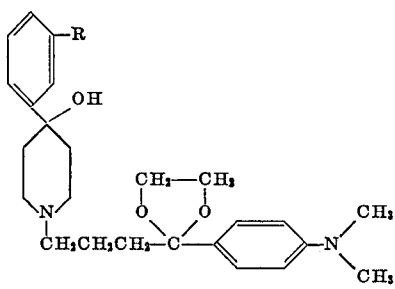

wherein R is a member selected from the group consisting of chloro, bromo, iodo, fluoro and trifluoromethyl, and the pharmaceutically acceptable nontoxic salts thereof.

7. A compound of claim 1 having the formula

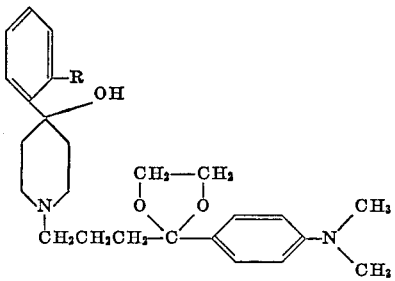

wherein R is a member selected from the group consisting of chloro, bromo, iodo, fluoro and trifluoromethyl, and the pharmaceutically acceptable nontoxic salts thereof.

8. The compound of claim 1 having the formula

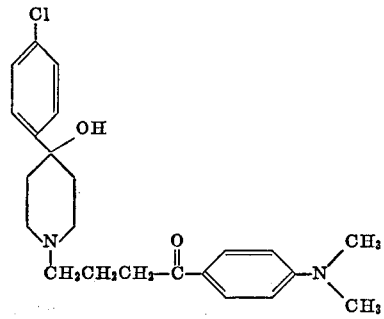

9. The compound of claim 1 having the formula

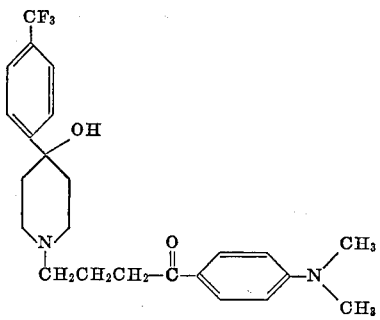

10. The compound of claim 1 having the formula

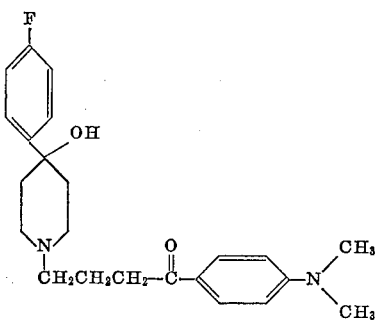

11. The compound of claim 1 having the formula

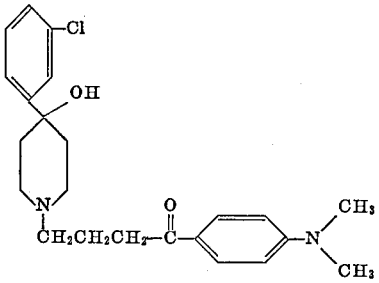

12. The compound of claim 1 having the formula

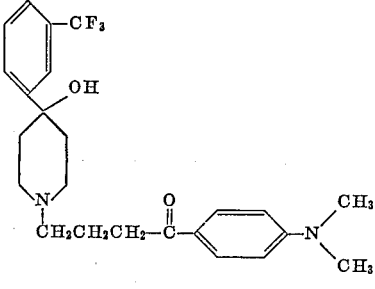

13. The compound of claim 1 having the formula

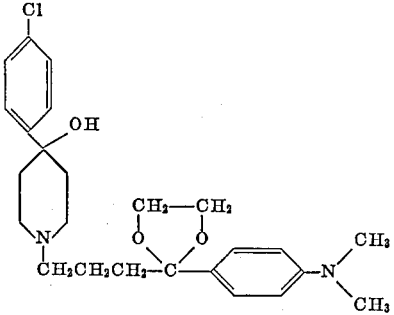

14. The compound of claim 1 having the formula
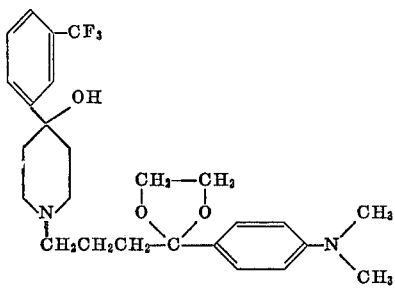
References Cited
UNITED STATES PATENTS
| 1,915,334 | 6/1933 | Salzberg et al. | 260—243 |
| 2,075,359 | 3/1937 | Salzberg et al. | 167—22 |
| 3,209,006 | 9/1965 | Wragg et al. | 260—294.75 |
FOREIGN PATENTS
632,437  12/1961  Canada.
HENRY R. JILES, Primary Examiner
S. D. WINTERS, Assistant Examiner
U.S. Cl. X.R.
260—294, 340.9, 574, 591, 592; 424—267